United States Patent

Persson

[11] Patent Number: 4,632,164
[45] Date of Patent: Dec. 30, 1986

[54] ROTATION RING BARKER
[75] Inventor: Börje Persson, Norrala, Sweden
[73] Assignee: Söderhamns Verkstäder AB, Sweden
[21] Appl. No.: 757,261
[22] Filed: Jul. 22, 1985
[30] Foreign Application Priority Data Aug. 24, 1984 [SE] Sweden .................................. 8404217
May 9, 1985 [SE] Sweden .................................. 8502304

[51] Int. Cl.⁴ .............................................. B27L 1/00
[52] U.S. Cl. .................................. 144/341; 144/208 E
[58] Field of Search ............... 144/208 E, 208 R, 340, 144/341

[56] References Cited
U.S. PATENT DOCUMENTS 3,667,517 6/1972 Bently et al. ................... 144/208 E
4,122,877 10/1978 Smith et al. ..................... 144/208 E Primary Examiner—W. D. Bray
Attorney, Agent, or Firm—Larson & Taylor

[57] ABSTRACT

A rotation ring barker comprises a stator and a rotor which has an opening for lengthwise feeding of a log and which is associated with a number of working tools, each of which is actuated by a spring mechanism normally striving to maintain the tool yieldingly urged against a log passing through the rotor for removing the bark from the log. If necessary, the individual tools are jointly movable in a direction outwardly from the log against the action of said spring mechanism. Positioned between the rotor and stator is a ring element which is rotatably mounted on said rotor and, during normal operation, follows the rotor. The ring element is connected, via a transmission, with the drive shaft of a pump mounted on and constantly following the rotor. The stator has a braking device adapted to reduce, when need arises, the speed of the ring element relative to the speed of the rotor, preferably to zero, thereby to activate the pump via the transmission so that the pump may transmit to the working tool a force overcoming the pressure of said spring mechanism and causing the tool to swing outwardly away from the center of the rotor.

5 Claims, 5 Drawing Figures

ROTATION RING BARKER

BACKGROUND OF THE INVENTION

The present invention relates to a rotation ring barker comprising a stator and a rotor rotatably mounted thereon, said rotor having an opening for lengthwise feeding of a log to be barked and being associated with a number of pivotal working tools, each of which is actuated by a spring mechanism normally striving to maintain the tool yieldingly urged against a log passing through the rotor for bark removal, the individual tools, when the need arises, being jointly movable outwardly away from the log or the rotor centre against the action of said spring mechanism.

DESCRIPTION OF THE PRIOR ART

In machines of the above-mentioned type, it is desired for a number of reasons that the working tools be instantaneously disengageable from the log, for example when a new unbarked log is to be fed into the rotor. In conventional barkers lacking special equipment for distinctly causing the tools to swing away from the log, the leading end of the log is allowed to bump against the tools which thus open up and abut against the log side. The force of these bumps is considerable so that both the tools and the remaining machine components are subjected to an intense strain reducing the life of the individual components and also of the machine in its entirety. Furthermore, it is essential that the tools can be opened in the event of a breakdown of either one of the two feeding devices mounted on either side of the stator or the machine frame and serving to feed the logs lengthwise through the central opening of the rotor, past the tools. Thus, if feeding of the log through the rotor is discontinued, the working tools will fairly rapidly cut into the log side a circumferential groove which, on the one hand, may drastically reduce the yield obtainable from the log and make the log more or less worthless from the viewpoint of board production and, on the other hand, may cause serious difficulties in connection with the starting up of the log after the breakdown in the feeding device or devices has been eliminated.

Among experts, it is has been endeavoured to remedy these problems and to provide facilities for separating the working tools from one another when the need arises. Thus, it is has been suggested to transmit from a power source on the stator, via so-called swivels or swivel couplings, to the rotor a force capable of swinging the tools away from the log, and this may be carried out by both pneumatic, hydraulic and electric means. However, these attempts have proved futile because swivel couplings between the stationary stator and the rotor operating at fairly high speed cannot be constructed in a sufficiently reliable manner in the rough environment within which barkers are always operating.

SUMMARY OF THE INVENTION

The present invention aims at providing a barker in which the barking or working tools can be rapidly and reliably moved out of the region of the rotor centre against the action of the spring mechanism the moment this becomes necessary. This object is achieved according to the principle of the invention in that there is provided between the rotor and the stator a ring mounted on the rotor and normally operating at the same speed as the rotor, said ring being connected, via a transmission, with the drive shaft or drive member of at least one motor mounted on the rotor and constantly carried along thereby, the stator having a braking device adapted to reduce, when the need arises, the speed of the ring in relation to the rotor speed, preferably to zero, while providing for relative movement between said rotor and said ring, the said relative movement causing the motor drive shaft, via said transmission, to rotate such that the motor, in its turn, transmits to the working tool and/or the spring mechanism a force overcoming the pressure of the spring mechanism and causing the tool to swing outwardly away from the rotor centre.

Besides the barker proper, the present invention also comprises a method of operating such a machine. The special features of this method are set out in more detail in the appended claims.

DETAILED DESCRIPTION OF A PREFERRED EMBODIMENT OF THE INVENTION

Figure 1:
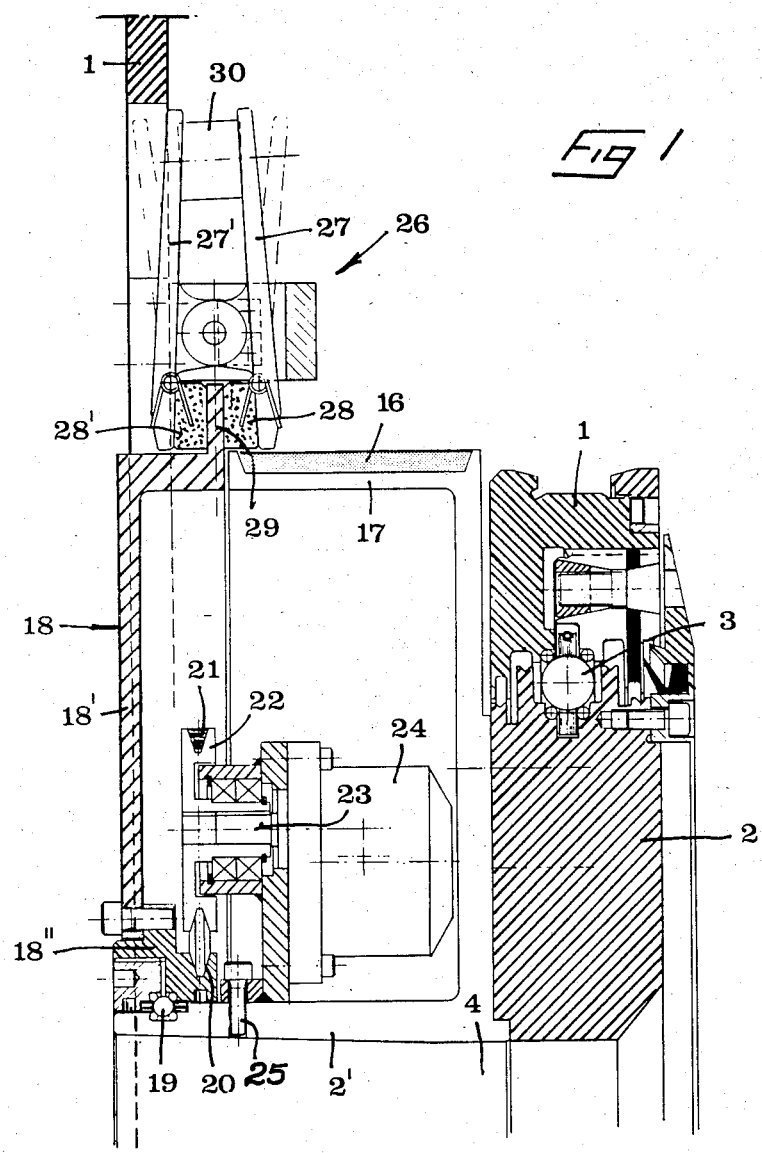
FIG. 1 is a simplified cross-sectional view of a part of the barker according to the present invention, i.e. the transition between the rotor and the stator.

FIG. 1 shows parts 1 of a stationary frame for which, in the following discussion the collective term stator is used. A rotor 2 is mounted within the stator 1, more particularly by means of a bearing 3. The centre of the rotor 2 has an opening 4 through which a log can be fed essentially parallel to the central axis of rotation (not shown) of the rotor 2. Feeding of the log is accomplished by the provision of two feeding devices (not shown) mounted on either side of the stator or frame 1 and preferably comprising three spiked rolls pivotally and hydraulically movable towards and away from the log.

Figure 2:
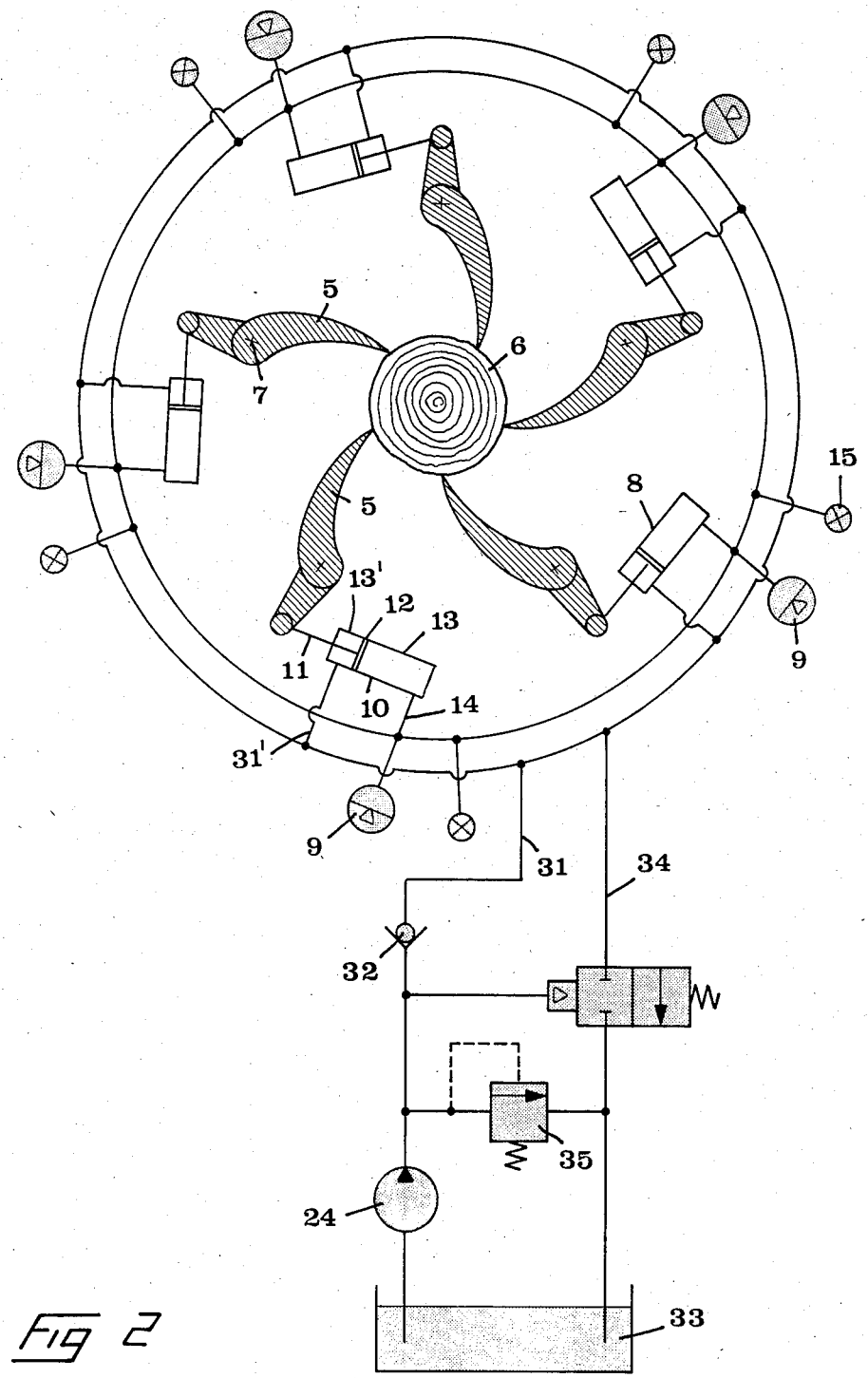
FIG. 2 is a simplified diagram showing two hydraulic circuits for the machine according to the invention as well as a number of tools working a log.

Mounted on the rotor 2 are a plurality of working tools, in the present instance five working tools, for barking the log fed through the opening 4. These tools (not shown in FIG. 1) are designated 5 in FIG. 2 which also shows a log 6. In actual practice, these tools consist of arms mounted on pivot pins 7 and being provided at their free ends with cutting blades which, during normal operation, are maintained in contact with the side of the log 6 for cutting or shearing away the bark layer. Each arm is actuated by an associated spring mechanism which comprises a piston and cylinder unit 8 and a pressure accumulator 9. Each such unit 8 comprises, in addition to a cylinder 10, a piston rod 11 hingedly connected with the tool arm 5, and a piston 12 dividing the cylinder 10 into two separate chambers 13, 13', of which the chamber 13 communicates with the pressure accumulator 9 via a conduit 14. A greater or less quantity of pressure medium can be supplied, via a supply device 15 operating as a regulator, to the cylinder chamber 13 and the accumulator communicating therewith, in order to increase or reduce an pressure within the said chamber according to need. FIG. 2 illustrates how the individual tool arm 5, when its free end is moving outwardly away from the machine centre (for example at the increasing log diameters), i.e. when swinging counterclockwise about its pivot pin 7, will urge the piston 12 into the cylinder 10, thereby reducing the volume of the chamber 13. As a result, the pressure in the associated accumulator 9 will be increased, and also the force by which the arm 5 is urged against the log will be increased.

The machine as described above is previously known per se. For the sake of completeness, it should be noted that the rotor 2 (see FIG. 1) is caused to rotate with respect to the stator 1 by means of a motor mounted on the stator and transmitting its power to the rotor via a heavy belt 16 which engages a peripheral flange portion 17 of the rotor.

Under the principle of the present invention, there is provided between the stator 1 and the rotor 2 an annular member 18 in the form of a disk which is mounted on the rotor 2 by means of a bearing 19. In the embodiment illustrated, the annular member is formed of two halves, an outer half 18' and an inner half 18''. The inner half 18'' is formed with a circumferential groove 20 for a V belt 21 which engages the groove 20 and is laid over a belt pulley 22 which in turn is non-rotatably connected with the drive shaft 23 of a pump which is designated 24 in its entirety and which is mounted on the rotor 2 and constantly follows the movement thereof. More particularly, the pump 24 is mounted on the outer side of an essentially cylindrical neck portion 2' of the rotor, for instance by means of screws 25.

Mounted on the stationary stator 1 is a braking device which is designated 26 in its entirety and which may consist of, for example, two pivotal arms 27, 27', each of which has a brake shoe 28, 28' positioned on either side of a peripheral portion 29 of the outer ring half 18'. Normally, the brake shoes 28, 28', are spaced so far apart that the annular portion 29 goes free. However, the arms 27, 27' may be swung relative to one another by means of a pneumatic pressure actuator 30, such that the brake shoes 28, 28' are urged against the annular portion 29 for braking the annular member 18.

As can be seen from FIG. 2, the pump 24 is connected, via a main conduit 31 and a number of branch conduits 31', to each of the hydraulic cylinders 10 serving as spring mechanisms, more particularly to the chambers 13' therein. The conduit 31 comprises a non-return valve 32 allowing hydraulic fluid to pass from the pump 24 to the chambers 13', but not in the opposite direction. For returning hydraulic fluid from the chambers 13' to a tank 33 cooperating with the pump 24, a return conduit 34 is provided. Between the supply conduit 31 and the return conduit 34, an overflow valve 35 is provided which prevents the build-up of too high a pressure in the supply conduit and, thus, in the chambers 13'.

OPERATION OF THE INVENTION

During normal operation, when the working tools 5 are yieldingly urged against the log 6 by means of the associated spring mechanisms 8, 9, the brake shoes 28, 28' of the braking device 26 have been moved apart, such that the annular member 18 goes free, and the said annular member is carried along by the rotor 2 at the same speed. This means that the drive shaft 23 of the pump 24 is stationary, and that the pump thus is inoperative.

When it is desired to swing the working tools 5 away from the centre of the rotor, the braking device 26 is activated in that the brake shoes 28, 28' are applied against the peripheral portion 29 of the annular member which thus is a braked. This can be done either by slip braking or, preferably, by completely stopping the annular member. Since the rotor 2 continues to rotate continuously, there is obtained between the rotor and the annular member a speed difference which starts the pulley 22 and causes the shaft 23 to rotate. In other words, the pump 24 is activated while building up a pressure which, via the conduits 31, 31', is transmitted to the chambers 13' in each cylinder 10. This pressure is so adapted that it positively overcomes the pressure within the chambers 13, i.e. the pistons 12 are pushed into the cylinder while swinging the tools 5 in an outward direction, simultaneously as the pressure within the accumulators 9 is increased.

As soon as the brake 26 is again released, the annular member 18 again follows the rotor 2, whereby the pump 24 is again inactivated. As a result, the working tools are moved back towards the centre of the rotor and are again yieldingly urged against the log in that the pressure within the chambers 13' has again been relieved so that the spring pressure from the accumulators 9 will again become active.

The above-mentioned possibility of swinging the arms away from the rotor centre may advantageously be utilised regularly in connection with the feeding of an individual log into the machine, thereby preventing the log from bumping against the tools and subjecting them to strain. The possibility of swinging the arms away from the rotor centre may also be utilised in the event that feeding of the stock through the rotor for some reason or other should be discontinued, whereby continued wear of the log by the tools is prevented. Furthermore, this possibility may be utilised for controlling the machine in an entirely new manner, in accordance with the embodiment illustrated in FIGS. 3–5 and described in detail below.

Figure 5:
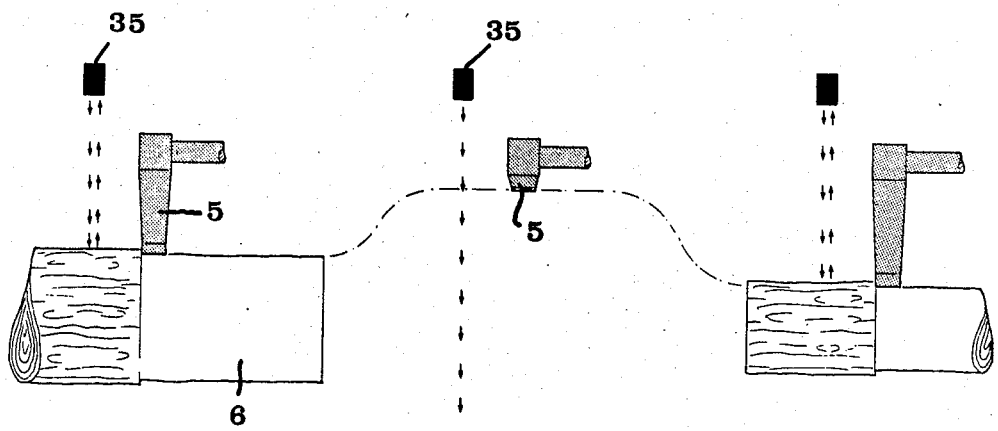
FIG. 5 is a diagrammatic longitudinal view of successive logs.

FIG. 5 illustrates diagrammatically how the tools 5 are associated with a transducer 35, for example a photocell for detecting a log, i.e. if a log is approaching the tools.

Figure 3:
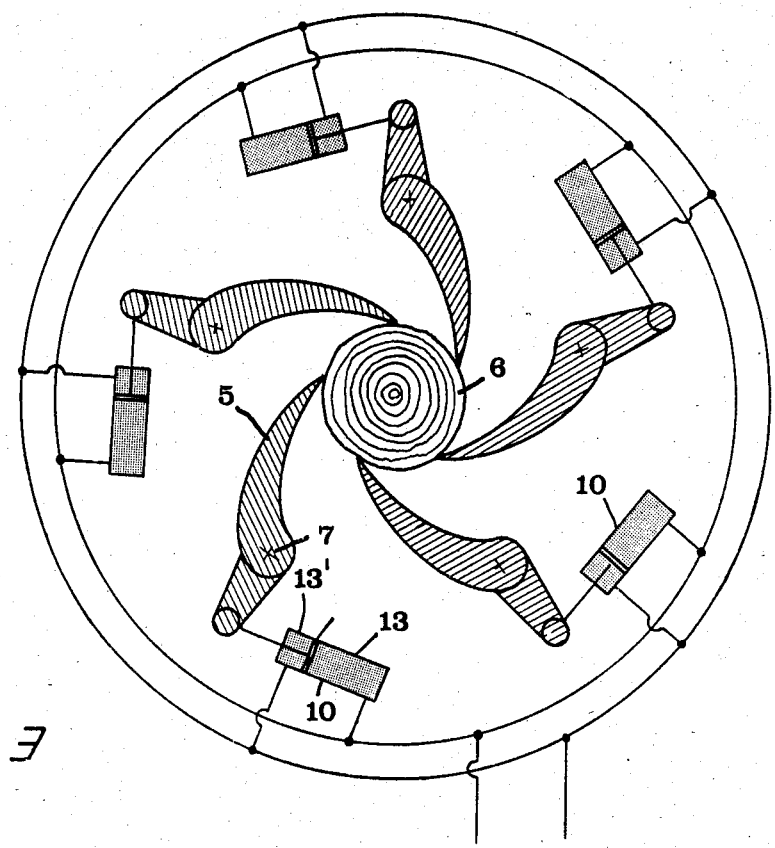
FIGS. 3 and 4 are diagrammatic views illustrating a log and a number of working tools therefor in two different operating positions.
Figure 4:
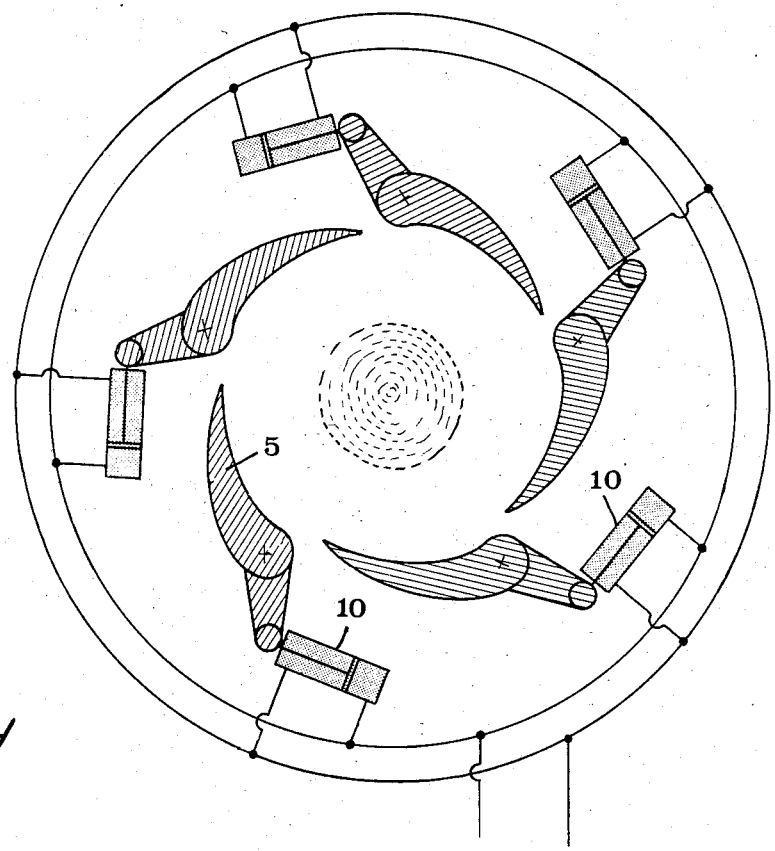

In accordance with the embodiment shown in FIGS. 3–5, the tools are maintained in an initial or stand-by condition in which they are swung out to the positions shown in FIG. 4 as long as the transducer 35 indicates the absence of a log in the machine. The arms are swung out into these initial positions in the manner previously described, by braking the annular member 18 so that the chambers 13' are supplied with fluid of a pressure higher than the pressure of the fluid in the chambers 13. Preferably, although not necessarily, the tools 5 are swung out to their end positions in which they are maximally spaced from the centre. In any event, the arms are swung out so far that each arm is spaced from the centre a distance which is conspicuously longer than the radius of the incoming log.

As soon as the transducer 35 indicates that a log is on its way towards the tools, the pressure in the chambers 13 is relieved, and the holding pressure within the chambers 13 causes the arms to be swung in and urged against the log within the region of its leading end, whereupon barking is commenced in conventional manner. When barking has been finished, and the log has passed the tools, the arms are returned into their outwardly swung initial positions, as shown in FIG. 4 and in the centre of FIG. 5, respectively.

ADVANTAGES OF THE INVENTION

Since, in accordance with the principle of the present invention, the tools are moved inwardly against the log when barking is commenced, the log end will not be damaged, the barking tools can be manufactured without special and complicated climbing edges, and furthermore the cutting or working means can be in the form of simple scrapers. Furthermore, the log can be worked with a comparatively low contact pressure of the feed rolls of the machine, whereby damage to the wood of the log by the spikes of the feed rolls is minimised. Furthermore, any tendency to log rotation while the log is being fed into the machine is avoided. Finally, it should be noted that the removal of bark from the rotor is much improved in that the tools are removed from one another instead of being brought closely together.

POSSIBLE MODIFICATIONS OF THE INVENTION

It will be appreciated that the invention is not restricted merely to the embodiment described above and illustrated in the drawings. Thus it is conceivable to use, instead of a hydraulic pump, other types of power generating mechanisms for the same purpose. The important thing is that the power generating mechanism in question follows the rotor and that a speed difference between the rotor and the said annular member is utilised via a transmission for activation of the mechanism. Furthermore, the belt may be replaced by other types of transmissions, for example gear transmissions, i.e. a rack on the annular member engaging a gear on the drive shaft of the pump or the power generating mechanism.

To realize the mode of operation illustrated in FIGS. 3–5, it is also possible to use any suitable mechanical components whatsoever. Thus, it is possible to return the tools into their outwardly swung initial positions by means of mechanical springs, against the action of which the tools can be swung into their active positions by means of single-acting fluid cylinders, instead of with the arrangement shown in FIG. 1.

What I claim and desire to secure by Letters Patent is:

1. A rotation ring barker comprising; a stator, a rotor rotatably mounted on the stator, said rotor having an opening for lengthwise feeding along its axis of a log to be barked, a number of pivotal working tools operatively connected to the rotor, a spring mechanism for actuating each tool, each spring mechanism having means for normally striving to maintain the tool yieldingly urged against a log passing through the rotor for bark removal, the individual tools being jointly movable outwardly away from the log against the action of said spring mechanism, a ring operatively mounted between the rotor and the stator, said ring mounted on the rotor and normally operating at the same speed as the rotor, a transmission means for operatively connecting the ring with a drive member of at least one pump means mounted on the rotor, said ring being normally carried along with the rotor, the stator having a braking means for selectively reducing the speed of the ring in relation to the rotor speed, while permitting limited relative movement between said rotor and said ring, wherein said relative movement causes the drive member, via said transmission means, to rotate such that its pump means in turn transmits to the working tool a fluid force overcoming the pressure of the spring mechanism and causing the tool to swing outwardly away from the log.

2. A rotation ring barker as claimed in claim 1, wherein said spring mechanism comprises a piston and cylinder unit and a pressure accumulator communicating with said piston and cylinder unit, the piston of said unit having a piston rod connected to a working tool and wherein said pump means is a hydraulic pump having a pressure conduit connected to said piston and cylinder unit on the same side of the piston of said unit as is said piston rod.

3. A rotation ring barker as claimed in claim 1, wherein said transmission means comprises a belt means laid over a belt groove formed on said ring, and including a second groove formed in a pulley mounted on the pump means drive member.

4. A rotation ring barker as claimed in claim 1, wherein said braking means has two relatively movable brake shoes mounted to be selectively urged against a peripheral portion of said ring.

5. A method of operating a rotation ring barker of the type comprising a stator and a rotor rotatably mounted thereon, the rotor having an opening for lengthwise feeding of a log to be barked, as well as a number of working tools pivotally movable and adapted to be yieldingly urged against a log passing through the rotor for removing the bark from the log, comprising the steps of holding the working tools in an initial position swung outwardly away from the log, and then moving the working tools inwardly, against the log, only when the leading end of the log reaches the region of the working tools, and again swinging the working tools outwardly into their initial position when working of the log is finished.

* * * * *